(12) United States Patent
Wang

(10) Patent No.: US 12,251,815 B1
(45) Date of Patent: Mar. 18, 2025

(54) INTELLIGENT FLEXIBLE BIOMIMETIC FACIAL-EXPRESSION ROBOT

(71) Applicant: Quansheng Wang, Guangdong (CN)

(72) Inventor: Quansheng Wang, Guangdong (CN)

(\*) Notice: Subject to any disclaimer, the term of this patent is extended or adjusted under 35 U.S.C. 154(b) by 0 days.

(21) Appl. No.: 18/954,954

(22) Filed: Nov. 21, 2024

(30) Foreign Application Priority Data

Nov. 24, 2023 (CN) .......................... 202311593991.4

(51) Int. Cl.
  *B25J 11/00* (2006.01)
(52) U.S. Cl.
  CPC .................................. *B25J 11/0015* (2013.01)
(58) Field of Classification Search
  CPC ... B25J 11/0015; B25J 11/001; B25J 11/0005; A63H 13/005; A63H 3/365; A63H 3/48
  USPC ........................................................ 74/471 R
  See application file for complete search history.

(56) References Cited

U.S. PATENT DOCUMENTS

| | | | | |
|---|---|---|---|---|
| 6,544,094 | B1 * | 4/2003 | Maddocks | A63H 3/365 446/337 |
| 2004/0249510 | A1 * | 12/2004 | Hanson | B25J 11/0015 700/245 |
| 2013/0139631 | A1 * | 6/2013 | Lin | A63H 13/005 74/471 R |
| 2019/0381415 | A1 * | 12/2019 | McMullen | A63H 33/26 |

\* cited by examiner

*Primary Examiner* — T. Scott Fix
(74) *Attorney, Agent, or Firm* — Daniel M. Cohn; Howard M. Cohn

(57) ABSTRACT

An intelligent flexible biomimetic facial-expression robot is provided and includes a model head, a skeleton, a drive means, and an epidermal layer. The skeleton defines two first slide slots and two first notches. The drive means includes a mounting bracket, an eyebrow drive module, and an eyelid drive module. The eyebrow drive module includes a first drive source, a first crank, and a first rocker. The eyelid drive module includes a second rocker. The epidermal layer defines two first areas and two second areas. Each of the first crank and the second crank passes through the two first slide slots. A distal end of the first crank drives the two first areas, asynchronous with respect to the second crank driving the two second areas, and the two first areas and the two second areas flexibly deform to generate expressions.

13 Claims, 9 Drawing Sheets

INTELLIGENT FLEXIBLE BIOMIMETIC FACIAL-EXPRESSION ROBOT

FIELD

The present disclosure relates to the technical field of biomimetic robots, and in particular to an intelligent flexible biomimetic facial-expression robot.

BACKGROUND

With the development of science and technology, humanoid robot technology has been evolving at an accelerated pace and has become a new highland in scientific and technological competition. Domestic humanoid robots have emerged from scratch, with endless technological achievements, continuously expanding application scenarios, and the localization process of core components has been continuously accelerated, gradually moving towards a more advanced and intelligent direction. However, the indifferent or mechanized expressions of current humanoid robots bring a bad user experience. Therefore, modern science and technology pay more and more attention to the research on biomimetic expressions of machines. In the prior art, the control mechanisms for biomimetic expressions of robots are complex, difficult to manufacture, and robot expressions are unnatural. In particular, the flexible change effect of robot expressions is poor, and it is impossible to realize the intelligent and flexible development of human-like expressions of robots.

Shenzhen Gamtee Hezhong Tech. Co., Ltd. has proposed a human-like facial-expression means and a robot including the same (in a patent No. CN206296916U). The human-like facial-expression means includes an eye movement module for eye movement and a cheek movement module for cheek movement. The cheek movement module includes a cheek driving mechanism and a swinging mechanism. The eye movement module includes an eye movement assembly. The eye movement assembly includes a first eye driving mechanism, a first link rod assembly, and eyeballs. This technical solution solves problems of simple mechanism actions and single expressions to a certain extent.

A patent application No. CN107053210A discloses a robot head device and a robot. The robot head device includes an eye assembly, an eyebrow assembly, a mouth assembly, and a head support assembly. The eye assembly, the eyebrow assembly, and the mouth assembly are connected to the head support assembly. The eye assembly includes an eyeball assembly. The eyeball assembly includes a simulated eyeball. The simulated eyeball is rotatably connected to the head support assembly. The simulated eyeball is driven to rotate by two sets of four-bar mechanisms.

A patent No. CN111531553B proposed by Harbin Institute of Technology discloses a humanoid robot head based on a connecting-rod compliance-expression-control mechanism. The humanoid robot head includes a robot head frame, an eyeball-rotation driving assembly, a mouth assembly, two eyebrow assemblies, and two eyeball assemblies. The mouth assembly is mounted on a bottom of the robot head frame, two eyeball assemblies are symmetrically mounted on the robot head frame above the mouth assembly, the eyeball-rotation driving assembly is connected with the two eyeball assemblies, and an eyebrow assembly is mounted above each eyeball assembly. Through this solution, simulation effect of human facial expressions can be achieved to a certain extent.

However, although the robots described in aforementioned prior arts can simulate human-like expressions to a certain extent, it is difficult for the simulated expressions to achieve a flexible change effect. Moreover, each functional module of the robots includes a separate driving structure and link-transmission structure, resulting in a complex overall structure of the robots. In terms of driving, it is impossible to drive two areas of face to deform to generate expressions through one driving source. In addition, due to the complex mechanical structure, it is difficult to control distal ends of the robots to generate more flexible expression changes within limited head space. Therefore, it is necessary to provide an intelligent flexible biomimetic facial-expression robot with more variable human-like expressions and a simpler structure to meet user requirements and improve user experience.

SUMMARY

The present disclosure provides an intelligent flexible biomimetic facial-expression robot, which can generate more variable human-like expressions and has a composite and compact structure.

In order to solve the above-mentioned problems, an intelligent flexible biomimetic facial-expression robot is provided in the present disclosure. The intelligent flexible biomimetic facial-expression robot includes a model head, a skeleton, a drive means, and an epidermal layer. The skeleton defines two first slide slots and two first notches. A side of the skeleton is attached to a side of the model head. Each of the two first slide slots is communicated with a respective one of the two first notches. The drive means is located in the model head and includes a mounting bracket, an eyebrow drive module, and an eyelid drive module. The eyebrow drive module is connected to the mounting bracket and includes a first drive source, a first crank, and a first rocker. The first drive source is connected to the mounting bracket and configured to drive the first crank. The first crank is configured to drive the first rocker. The first rocker includes a first connection portion, a first body, and two first contact portions. An end of the first body is connected with the first connection portion, and the other end of the first body is connected with the two first contact portions. The first crank abuts against the first connection portion and is configured to drive the first connection portion. The eyelid drive module is connected to the mounting bracket and includes a second rocker. The first crank is configured to asynchronously drive the first rocker and the second rocker. The second rocker includes a second connection portion, a second body, and two second contact portions. An end of the second body is connected with the second connection portion, and the other end of the second body is connected with the two second contact portions. The first crank abuts against the second connection portion and is configured to drive the second connection portion. The first crank is located between the first connection portion and the second connection portion. The epidermal layer is attached to the other side of the skeleton away from the model head and defines two first areas and two second areas towards the skeleton. Each of the first body and the second body passes through the two first slide slots. Each of the two first contact portions is embedded in a respective one of the two first areas or wrapped by the respective one of the two first areas. Each of the two second contact portions is embedded in a respective one of the two second areas or wrapped by the respective one of the two second areas. When the first drive source drives the first crank, the two first contact portions drive the two first areas of the epidermal layer, asynchronous with respect to the two second contact portions driving the two second areas of the epidermal layer, and the two first areas and the two second areas of the epidermal layer flexibly deform to generate expressions.

In some embodiments, each of the two first areas defines a first groove. Each of the two first contact portions is embedded in the first groove of the respective one of the two first areas. The first groove of the respective one of the two first areas and the each of the two first contact portions satisfy a relationship: $1/4 \leq h/d \leq 2/3$. In detail, d represents a width of the first groove of the respective one of the two first areas, and h represents a thickness of the each of the two first contact portions.

In some embodiments, each of the two first areas is arranged with a first protrusion. Each of the two first contact portions is wrapped by the first protrusion of the respective one of the two first areas.

In some embodiments, each of the two first contact portions is arranged with a rounded corner at a contact position with the respective one of the two first areas.

In some embodiments, the drive means further includes a first support member. The first support member is connected to the mounting bracket. The two second areas are spaced apart from and symmetrical to each other. The first support member extends downward from a middle portion of the two second areas and abuts against the epidermal layer. At least two support ends are formed by the first support member supporting the epidermal layer.

In some embodiments, the epidermal layer is made of silicone or triblock copolymer. The first groove of the respective one of the two first areas and the epidermal layer satisfy a relationship: $1/3 \leq t/p \leq 2/3$. In detail, t represents a depth of the first groove of the respective one of the two first areas, and p represents a thickness of the epidermal layer.

In some embodiments, the skeleton is arranged with two bulges. Each of the two bulges is in an arc shape following a swing amplitude of the first rocker or the second rocker. Each of the two bulges is received in a respective one of the two first slide slots. The epidermal layer is attached to the two bulges.

In some embodiments, the drive means further includes an eye drive module, a cheek drive module, and a lip drive module. The epidermal layer further defines two third areas, two first opening areas, and a second opening area. The skeleton further defines two second slide slots and a second notch. The eye drive module includes two second drive sources, two second cranks, a tilting rod, two frames, and two eyeball models. Each of the two second drive sources is connected to the mounting bracket and is configured to drive a respective one of the two second cranks. One of the two second cranks abuts against one end of the tilting rod, the other of the two second cranks abuts against the other of the tilting rod. The two eyeball models are spaced apart from each other. Each of the two eyeball models is inserted into a respective one of the two frames. One of the two eyeball models is connected to one end of the tilting rod, and the other of the two eyeball models is connected to the other end of the tilting rod. Each of the two eyeball models penetrates a respective one of the two first notches and is received in a respective one of the two first opening areas. The cheek drive module includes a third drive source, a third crank, an adapter, and four third rockers. The third drive source is connected to the mounting bracket and is configured to drive the third crank. The third crank abuts against the adapter. Each of the four third rockers abuts against the adapter. Two of the four third rockers are configured to slide in one of the two second slide slots, and the other two of the four third rockers are configured to slide in the other of the two second slide slots. A distal end of each of the two of the four third rockers abuts against one of the two third areas, and a distal end of each of the other two of the four third rockers abuts against the other of the two third areas. The lip drive module includes a fourth drive source, a fourth crank, and a fourth rocker. The fourth drive source is connected to the mounting bracket and is configured to drive the fourth crank. The fourth crank abuts against the fourth rocker. The fourth rocker passes through the second notch. A distal end of the fourth rocker is located in the second opening area.

In some embodiments, the tilting rod includes a rod body, a first drive portion, and a second drive portion. The first drive portion is connected to an end of the rod body. The second drive portion is connected to the other end of the rod body. One side of the first drive portion abuts against one of the two second cranks, and the other side of the first drive portion is rotatably connected with one of the two eyeball models. One side of the second drive portion abuts against the other of the two second cranks, and the other side of the second drive portion is rotatably connected with the other of the two eyeball models.

In some embodiments, a length direction of the tilting rod is defined as a first direction, and a height direction of the tilting rod is defined as a second direction. A side of the first drive portion opens a first slot along the first direction, and on the same side as the side of the first drive portion, a side of the second drive portion opens a second slot along the second direction. One of the two second cranks is received in the first slot and abuts against the first drive portion, and the other of the two second cranks is received in the second slot and abuts against the second drive portion.

In some embodiments, each of the four third rockers includes a third connection portion, a third body, a third contact portion, and a tray. One end of the third body of a respective one of the four third rockers is connected with the third connection portion of the respective one of the four third rockers, and the other end of the third body of the respective one of the four third rockers is connected with the third contact portion of the respective one of the four third rockers. The third crank is configured to drive the third connection portion of the respective one of the four third rockers through abutting against the adapter. The tray of the respective one of the four third rockers is located between the third body of the respective one of the four third rockers and the third contact portion of the respective one of the four third rockers. The third contact portion of the respective one of the four third rockers abuts against a corresponding one of the two third areas and the tray of the respective one of the four third rockers is attached to a periphery of the corresponding one of the two third areas.

In some embodiments, an angle of a movement of the each of the four third areas of the epidermal layer driven by the third contact portion of the respective one of the four third rockers is in a range of 0° to 60°.

In some embodiments, the fourth rocker includes a support portion. The support portion is located at an end of the fourth rocker away from the fourth crank. The support portion abuts against an area of the epidermal layer below the second opening area.

The embodiments of the present disclosure may have the following beneficial effects.

1. For the intelligent flexible biomimetic facial-expression robot in the present disclosure, the epidermal layer defines two first areas and two second areas towards the skeleton, each of the first body and the second body passes through the two first slide slots, so that each of the two first contact portions is embedded in a respective one of the two first areas or wrapped by the respective one of the two first areas, and each of the two second contact portions is embedded in a respective one of the two second areas or wrapped by the respective one of the two second areas. When the first drive source drives the first crank, the two first contact portions drive the two first areas of the epidermal layer, asynchronous with respect to the two second contact portions driving the two second areas of the epidermal layer, thus the two first areas and the two second areas of the epidermal layer flexibly deform to generate expressions. In this way, the problems of poor flexible change effect of expressions in the existing robots can be solved.

2. For the intelligent flexible biomimetic facial-expression robot in the present disclosure, since the first crank is located between the first connection portion and the second connection portion, the first crank can asynchronously drive the first rocker and the second rocker, thus each of the two first contact portions drives a respective one of the two first areas, asynchronized with respect to each of the second contact portions driving a respective one of the two second areas, so that the two first areas and the two second areas of the epidermal layer synchronously flexibly deform in a same direction with different deformation amounts, thereby greatly reducing the complexity of the structure of the intelligent flexible biomimetic facial-expression robot.

3. For the intelligent flexible biomimetic facial-expression robot in the present disclosure, since each of the two first areas defines a first groove, each of the two first contact portions is embedded in the first groove of a respective one of the two first areas, and a width d of the first groove of the respective one of the two first areas and a thickness h of the each of the two first contact portions satisfy a relationship: $1/4 \leq h/d \leq 2/3$. In this way, deformation strength of the two first areas can be improved, while the two first areas can be prevented from forming deformation bulges that may cause an abnormal change in expressions.

4. For the intelligent flexible biomimetic facial-expression robot in the present disclosure, each of the two first contact portions is arranged with a rounded corner at a contact position with a respective one of the two first areas, the first support member abuts against the epidermal layer at a middle portion of a spacing between the two first areas and a spacing between the two second areas, each of the two bulges is in an arc shape following a swing amplitude of the first rocker or the second rocker, and each of the two bulges is received in a respective one of the two first slide slots. In this way, a force exerted on the each of the two first areas can be dispersed, and the deformation of the two first areas or the two second areas can be supported. In particular, the curved arrangement of the each of the two bulges of the skeleton can prevent excess movement of the first rocker from interfering with the deformation of the two first areas or the two second areas.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

Figure 1:
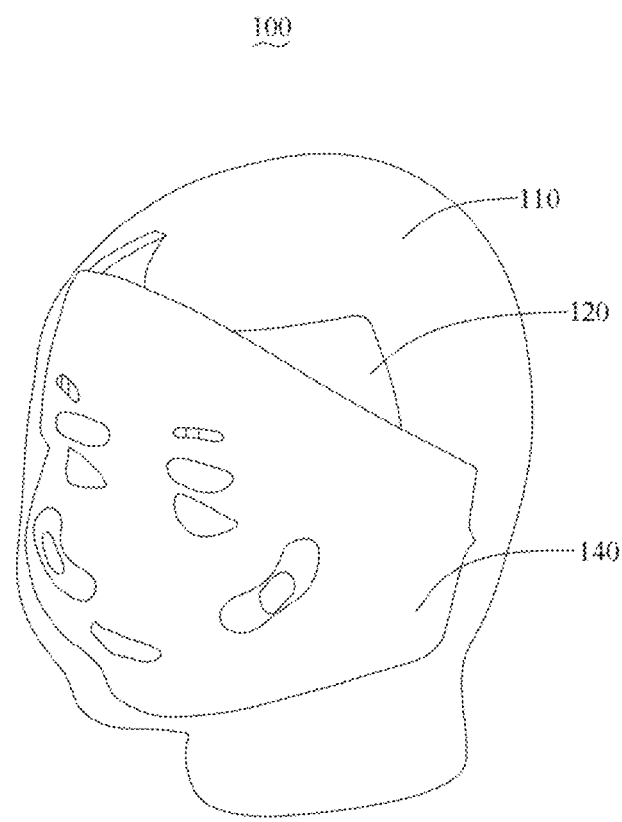
FIG. 1 is a structural view of an intelligent flexible biomimetic facial-expression robot according to an embodiment of the present disclosure.

Reference numerals in the drawings: 100, intelligent flexible biomimetic facial-expression robot; 110, model head; 120, skeleton; 121, first slide slot; 122, first notch; 123, bulge; 124, second slide slot; 125, second notch; 130, drive means; 131, mounting bracket; 132, eyebrow drive module; 1321, first drive source; 1322, first crank; 1323, first rocker; 13231, first connection portion; 13232, first body; 13233, first contact portion; 13201, rounded corner; 133, eyelid drive module; 1331, second rocker; 13311, second connection portion; 13312, second body; 13313, second contact portion; 134, first support member; 135, eye drive module; 1351, second drive source; 1352, second crank; 1353, tilting rod; 13531, rod body; 13532, first drive portion; 13501, first slot; 13533, second drive portion; 13502, second slot; 1354, frame; 1355, eyeball model; 136, cheek drive module; 1361, third drive source; 1362, third crank; 1363, adapter; 1364, third rocker; 13641, third connection portion; 13642, third body; 13643, third contact portion; 13644, tray; 137, lip drive module; 1371, fourth drive source; 1372, fourth crank; 1373, fourth rocker; 13731, support portion; 140, epidermal layer; 141, first area; 1411, first groove; 1412, first protrusion; 142, second area; 143, third area; 144, first opening area; 145, second opening area.

DETAILED DESCRIPTION

In order to facilitate the understanding of the present disclosure, a more comprehensive description of the present disclosure will be made hereinafter with reference to relevant drawings. Preferred embodiments of the present disclosure are given in the drawings. However, the present disclosure can be implemented in many different forms and is not limited to the embodiments described herein. On the contrary, the purpose of providing these embodiments is to make the understanding of the disclosed content of the present disclosure more thorough and comprehensive.

It should be noted that when an element is referred to as being "fixed to" another element, it can be directly on the other element or there may also be an intervening element. When an element is considered to be "connected to" another element, it can be directly connected to the another element or there may be an intervening element at the same time. The terms "vertical", "horizontal", "left", "right" and similar expressions used herein are for illustrative purposes only.

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. The term "and/or" as used herein includes any and all combinations of one or more of the associated listed items.

Figure 2:
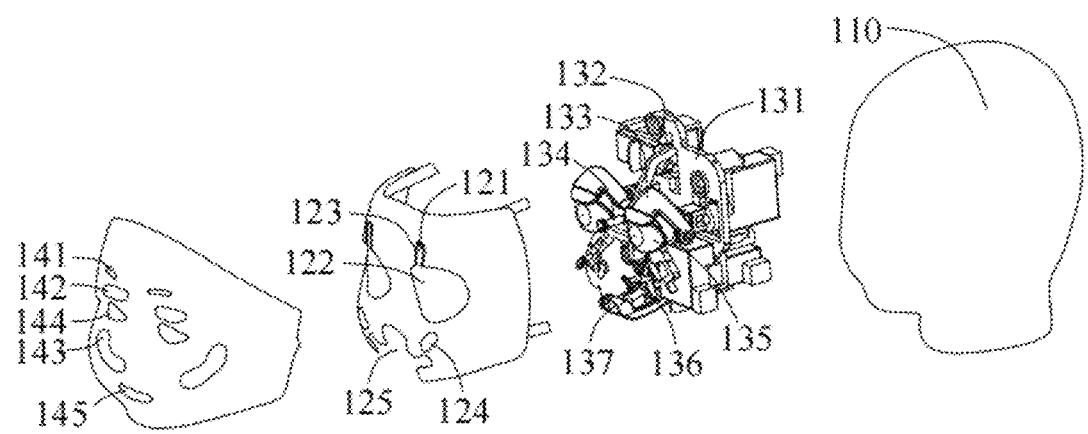
FIG. 2 is an exploded view of the intelligent flexible biomimetic facial-expression robot according to an embodiment of the present disclosure.
Figure 3:
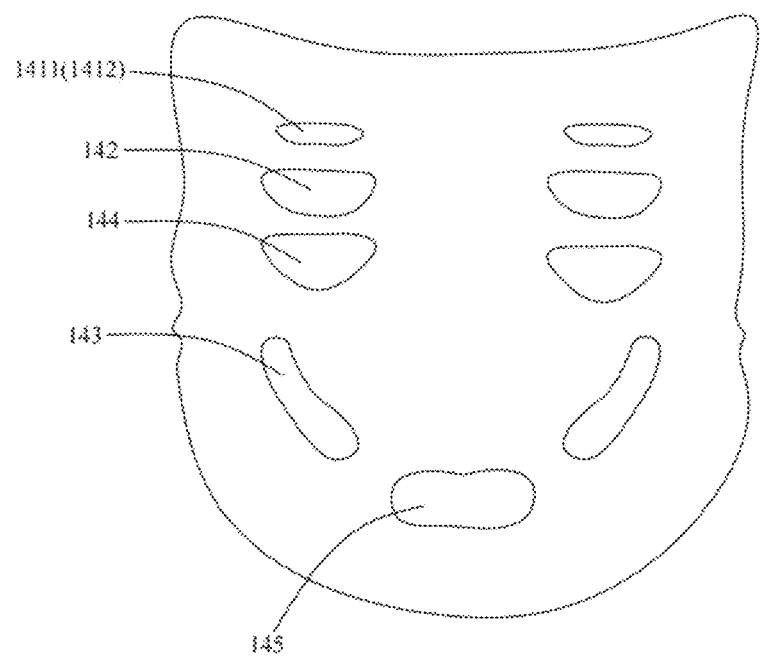
FIG. 3 is a rear view of an epidermal layer according to an embodiment of the present disclosure.
Figure 4:
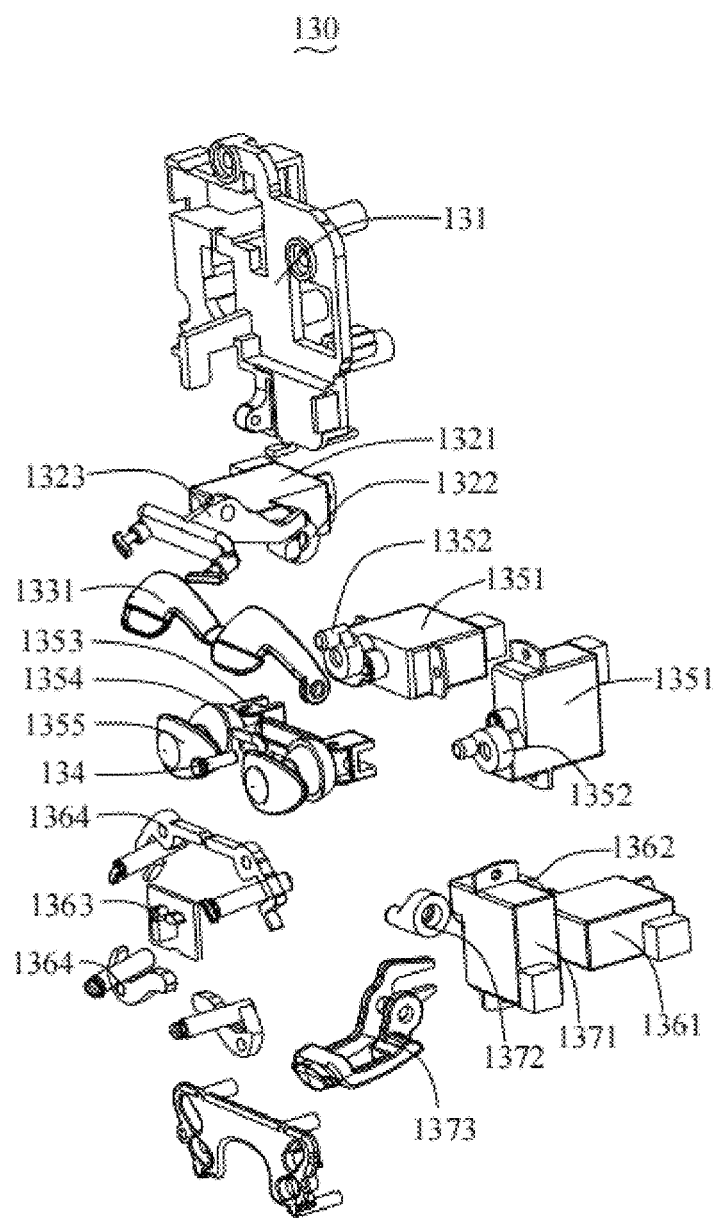
FIG. 4 is an exploded view of a driving means according to an embodiment of the present disclosure.
Figure 5:
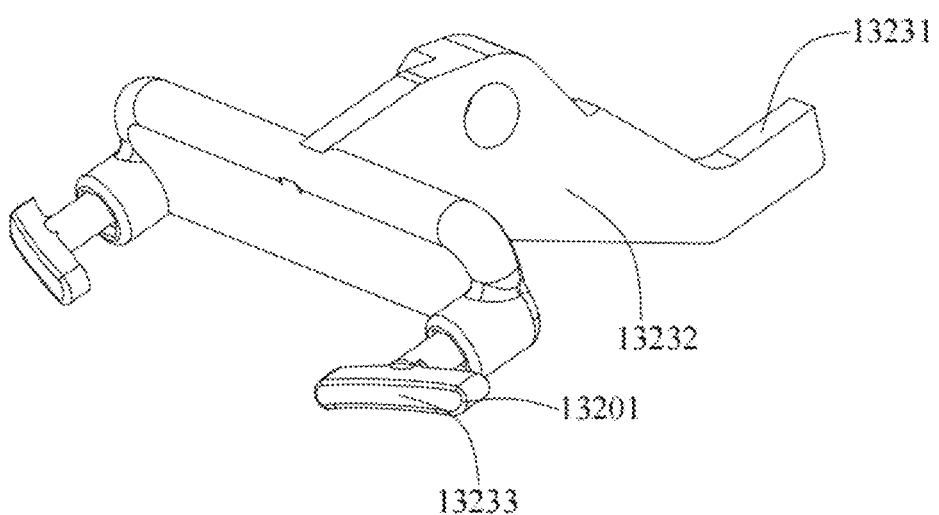
FIG. 5 is a structural view of a first rocker according to an embodiment of the present disclosure.
Figure 6:
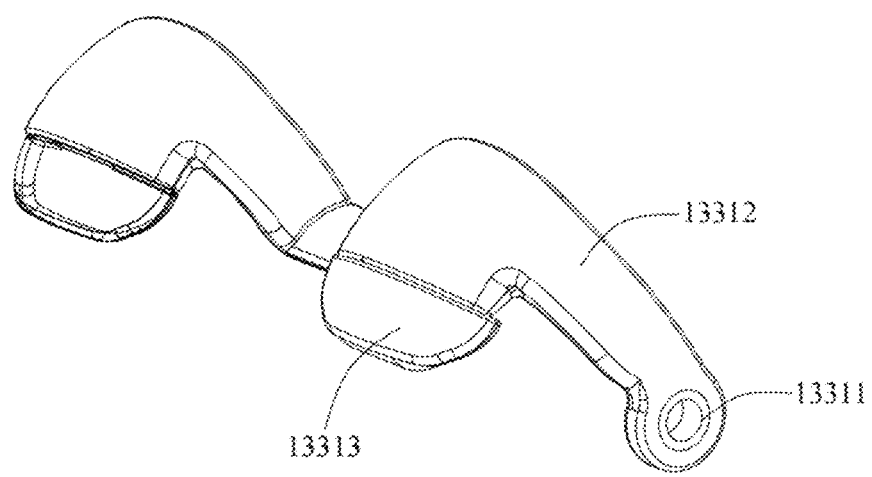
FIG. 6 is a structural view of a second rocker according to an embodiment of the present disclosure.
Figure 7:
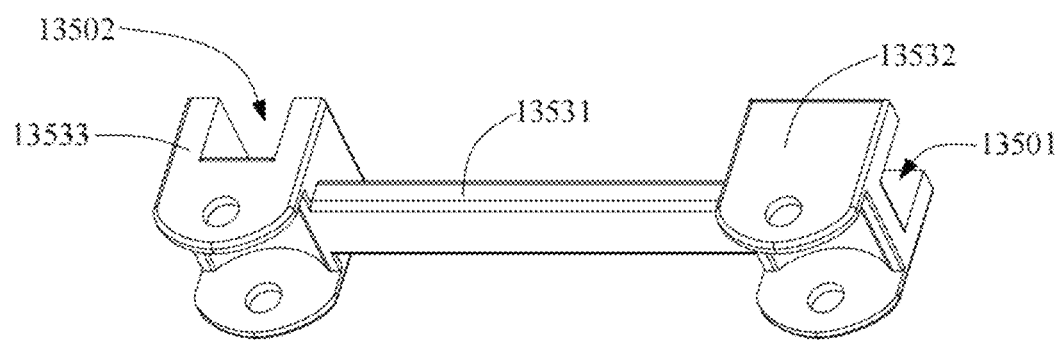
FIG. 7 is a structural view of a tilting rod according to an embodiment of the present disclosure.
Figure 8:
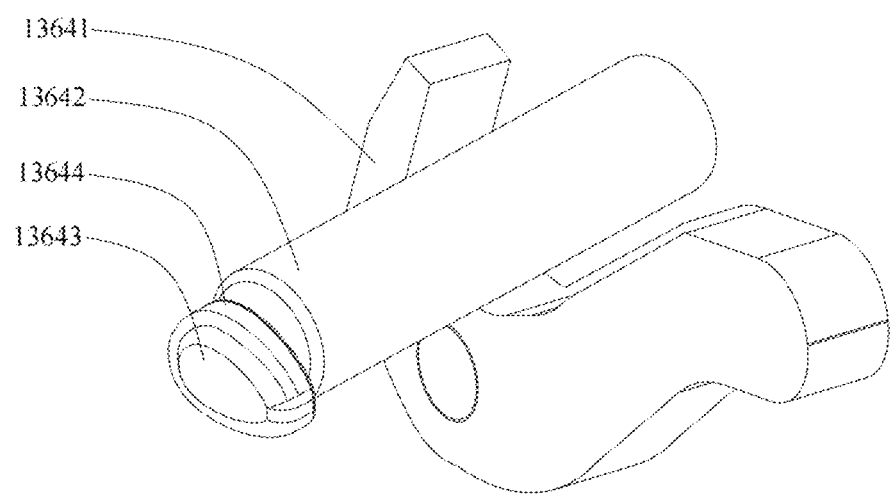
FIG. 8 is a structural view of a third rocker according to an embodiment of the present disclosure.
Figure 9:
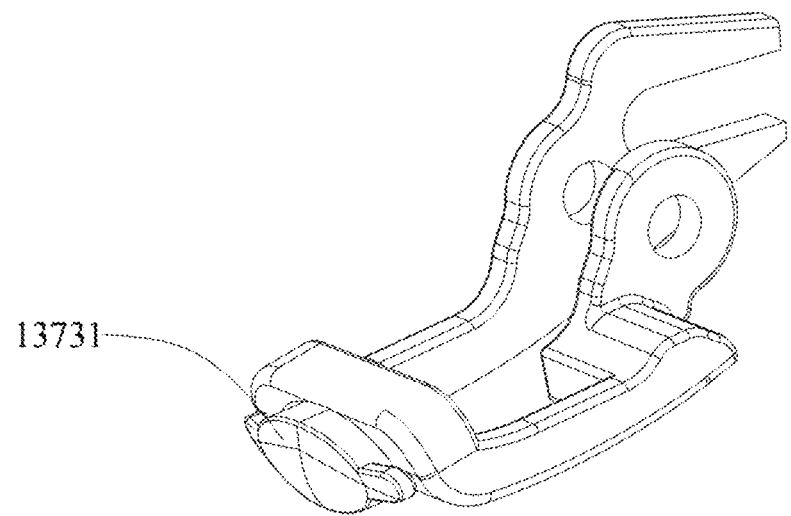
FIG. 9 is a structural view of a fourth rocker according to an embodiment of the present disclosure.

Referring to FIGS. 1-9, an intelligent flexible biomimetic facial-expression robot 100 is provided in the present disclosure. In an embodiment, the intelligent flexible biomimetic facial-expression robot 100 includes a model head 110, a skeleton 120, a drive means 130, and an epidermal layer 140. A side of the skeleton 120 is attached to a side of the model head 110. The skeleton 120 defines two first slide slots 121 and two first notches 122. Each of the two first slide slots 121 is communicated with a respective one of the two first notches 121. The drive means 130 is located in the model head 110. The drive means 130 includes a mounting bracket 131, an eyebrow drive module 132, and an eyelid drive module 133. The eyebrow drive module 132 and the eyelid drive module 133 are connected to the mounting bracket 131. The eyebrow drive module 132 includes a first drive source 1321, a first crank 1322, and a first rocker 1323. The first drive source 1321 is connected to the mounting bracket 131 and configured to drive the first crank 1322. The first crank 1322 is configured to drive the first rocker 1323. The first rocker 1323 includes a first connection portion 13231, a first body 13232, and two first contact portions 13233. An end of the first body 13232 is connected with the first connection portion 13231, and the other end of the first body 13232 is connected with the two first contact portions 13233. The first crank 1322 abuts against the first connection portion 13231 and is configured to drive the first connection portion 13231. The eyelid drive module 133 includes a second rocker 1331. The first crank 1322 is configured to asynchronously drive the first rocker 1323 and the second rocker 1331. The second rocker 1331 includes a second connection portion 13311, a second body 13312, and two second contact portions 13313. An end of the second body 13312 is connected with the second connection portion 13311, and the other end of the second body 13312 is connected with the two second contact portions 13313. The first crank 1322 abuts against the second connection portion 13311 and is configured to drive the second connection portion 13311. The first crank 1322 is located between the first connection portion 13231 and the second connection portion 13311. The epidermal layer 140 is attached to the other side of the skeleton 120 away from the model head 110. The epidermal layer 140 defines two first areas 141 and two second areas 142 towards the skeleton 120. Each of the first body 13232 and the second body 13312 passes through the two first slide slots 121. Each of the two first contact portions 13233 is embedded in the respective one of the two first areas 141 or wrapped by the respective one of the two first areas 141, and each of the two second contact portions 13313 is embedded in a respective one of the two second areas 142 or wrapped by the respective one of the two second areas 142. When the first drive source 1321 drives the first crank 1322, the two first contact portions 13233 drive the two first areas 141 of the epidermal layer 140, asynchronous with respect to the two second contact portions 13313 driving the two second areas 142 of the epidermal layer 140. In this way, the two first areas 141 and the two second areas 142 of the epidermal layer 140 flexibly deform to generate expressions. In specific applications, the first rocker 1323 and the second rocker 1331 are simultaneously driven by the first crank 1322. When the first drive source 1321 (a servo motor that can precisely control a rotation angle of the first crank 1322) rotates, since the first crank 1322 is located between the first connection portion 13231 and the second connection portion 13311, movements of the first rocker 1323 and the second rocker 1331 are asynchronously controlled by the first crank 1322. In this way, there is no need for multiple drive sources to control the movements of the first rocker 1323 and the second rocker 1331. Additionally, through this control manner, the action of the two first areas 141 (eyebrow areas) being raised and the two second areas 142 (eyelid areas) being pulled down simultaneously, an action not in human expressions, can be cleverly avoided. When each of the two first contact portions 13233 of the first rocker 1323 is embedded in the respective one of the two first areas 141 and each of the two second contact portions 13313 of the second rocker 1331 is embedded in the respective one of the two second areas 142, both the first body 13232 and the second body 13312 are slidably received in the two first slide slots 121, thereby enabling the two first areas 141 and the two second areas 142 flexibly deform to generate expressions, solving problems of poor flexible expression change effect and complex mechanical structure in existing robots. Additionally, it is worth noting that a shape and a size of each of the two first contact portions 13233 match the respective one of the two first areas 141, and a shape and an area of each of the two first areas 141 are in consistence with those of a normal eyebrow area of an ordinary person. A shape and a size of each of the two second contact portions 13313 match the respective one of the two second areas 142, and a shape and an area of each of the two second areas 142 are in consistence with those of a normal eyelid area of the ordinary person. In this way, biomimetic expressions of the aforementioned robot can have characteristics of human-likeness and flexibility.

In an embodiment, each of the two first areas 141 defines a first groove 1411, and each of the two first contact portions 13233 is embedded in the first groove 1411 of the respective one of the two first areas 141. The first groove 141 of the respective one of the two first areas 141 and the each of the two first contact portions 13233 satisfy a relationship: $1/4 \leq h/d \leq 2/3$. In detail, d represents a width of the first groove 141 of the respective one of the two first areas 141, and h represents a thickness of the each of the two first contact portions 13233. In specific applications, since each of the two first areas 141 defines a first groove 1411, each of the two first contact portions 13233 is embedded in the first groove 1411 of the respective one of the two first areas 141, and the width d of the first groove 141 of the respective one of the two first areas 141 and the thickness h of each of the two first contact portions 13233 satisfy a relationship: $1/4 \leq h/d \leq 2/3$, deformation strength of the two first areas 141 can be improved, while the two first areas 141 can be prevented from forming a deformation bulge that may cause an abnormal change in expressions. In this way, a problem that deformation effect of the two first areas 141 due to the ratio of h/d being less than 1/4 is not obvious, which results in the robot's expression change not being obvious, can be avoided. Moreover, a problem of the two first areas 141 of the epidermal layer 140 bulging outward due to the ratio of h d being greater than 2/3, thereby resulting in the abnormal change of expressions, can also be avoided. Particularly, $1/3 \leq h/d \leq 1/2$. It can be understood that each of the two second areas 142 defines a second groove, and each of the two first contact portions 13233 is embedded in the second groove of the respective one of the two second areas 142. The second groove of the respective one of the two second areas 142 and each of the two second contact portions 13313 satisfy a relationship: $1/4 \leq h1/d1 \leq 2/3$. In detail, d1 represents a width of the second groove of the respective one of the two second areas 142, and hl represents a thickness of each of the two second contact portions 13313.

In an embodiment, each of the two first areas 141 is arranged with a first protrusion 1412, and each of the two first contact portions 13233 is wrapped by the first protrusion 1412 of the respective one of the two first areas 141. In specific applications, each of the two first areas 141 may be arranged with a first protrusion 1412, and the first protrusion 1412 of the respective one of the two first areas 141 passes through a respective one of the two first slide slots 121 and wraps a respective one of the two first contact portions 13233. In this way, each of the two first contact portions 13233 can drag the respective one of the two first areas 141 to deform under the drive of the first drive source 1321. In addition, it can be understood that each of the two second areas 142 may also be arranged with a second protrusion, and each of the two second contact portions 13313 is wrapped by the second protrusion of the respective one of the two second areas 142. Alternatively, each of the two first areas 141 defines the first groove 1411, and each of the two first contact portions 13233 is embedded in the first groove 1411 of the respective one of the two first areas 141, while each of the two second areas 142 is arranged with a second protrusion, and each of the two second contact portions 13313 is wrapped by the second protrusion of the respective one of the two second areas 142. Alternatively, each of the two first areas 141 is arranged with the first protrusion 1412, and each of the two first contact portions 13233 is wrapped by the first protrusion 1412 of the respective one of the two first areas 141, while each of the two second areas 142 defines a second groove, and each of the two first contact portions 13233 is embedded in the second groove of the respective one of the two second areas 142.

In an embodiment, each of the two first contact portions 13233 is arranged with a rounded corner 13201 at a contact position with the respective one of the two first areas 141. In specific applications, each of the two first areas 141 defines the first groove 1411, and each of the two first contact portions 13233 is embedded in the first groove 1411 of the respective one of the two first areas 141, the rounded corner 13201 of the respective one of the two first contact portions 13233 is located at an edge of the respective one of the two first contact portions 13233. In this way, a contact area between each of the two first contact portions 13233 and the respective one of the two first areas 141 is increased, thus a force exerted on each of the two first areas 141 is uniform, and a deformation of the two first areas 141 of the epidermal layer 140 is uniform and controllable, and in particular, it can prevent a bulge from being formed by an edge of each of the two first contact portions 13233 in contact with the epidermal layer 140. In a case where each of the two first areas 141 is arranged with the first protrusion 1412, and each of the two first contact portions 13233 is wrapped by the first protrusion 1412 of the respective one of the two first areas 141, the rounded corner 13201 of the respective one of the two first contact portions 13233 is located at an inner edge of the respective one of the two first contact portions 13233. In this way, the contact area between each of the two first contact portions 13233 and the respective one of the two first areas 141 is increased, thus a force exerted on each of the two first areas 141 is uniform, and a deformation of the two first areas 141 of the epidermal layer 140 is uniform and controllable.

In an embodiment, the drive means 130 further includes a first support member 134. The first support member 134 is connected to the mounting bracket 131. The epidermal layer 140 defines the two second areas 142 that are spaced apart from and symmetrical to each other. The first support member 134 extends downward from a middle portion of the two second areas 142 and abuts against the epidermal layer 140, so that at least two support ends are formed by the first support member 134 supporting the epidermal layer 140. In specific applications, the first support member 134 extends downward from the middle portion of the two second areas 142 and abuts against the epidermal layer 140, and thus at least two support ends are formed by the first support member 134 supporting the epidermal layer 140. In this way, the two second areas 142 can be supported, and a deviation of each of the two second areas 142 relative to the epidermal layer 140 can be constrained, thereby preventing appearance of abnormally deformed expressions. Particularly, one of the at least two support ends can constrain an overall deformation of the two first areas 141, and the other of the at least two support ends can constrain an overall deformation of the two second areas 142. In this way, the deformation of the two first areas 141 and the two second areas 142 has a natural human-like effect.

In an embodiment, the epidermal layer 140 is made of silicone or triblock copolymer. The first groove 1411 of the respective one of the two first areas 141 and the epidermal layer 140 satisfy a relationship: $1/3 \leq t/p \leq 2/3$. In detail, t represents a depth of the first groove 1411 of the respective one of the two first areas 141, and p represents a thickness of the epidermal layer 140. In specific applications, the epidermal layer 140 is made of silicone, and when the epidermal layer 140 is too thick, an energy consumption of the first drive source 1321 (servo motor) is high, which is not conducive to extending an endurance time of the intelligent flexible biomimetic facial-expression robot 100 and reducing a production cost. When the epidermal layer 140 is too thin, an overall of the epidermal layer 140 may collapse, and it is not conducive to recovering the deformation of the epidermal layer 140, resulting in a lag and unnatural expression change. In order to better control a softness of the epidermal layer 140, the thickness of the epidermal layer 140 may generally be 2 mm and 10 mm. In an example, the thickness of the epidermal layer 140 corresponding to the two first areas 141 and the two second areas 142 is 2 mm. In addition, the epidermal layer 140 is made of liquid silicone below zero degree. Particularly, when a size of the robot 100 increases, the thickness of the epidermal layer 140 may correspondingly increase appropriately. When the robot is in a giant form, the thickness of the epidermal layer 140 is not less than 10 mm. However, there is a relationship of $1/3 \leq t/h \leq 2/3$ between the thickness p of the epidermal layer 140 and the depth/of the first groove 1411 of the respective one of the two first areas 141. When the thickness p of the epidermal layer 140 is much greater than 10 mm, the ratio between the thickness p of the epidermal layer 140 and the depth/of the first groove 1411 of the respective one of the two first areas 141 is 2/3. In this way, when the each of the two first contact portions 13233 drives the respective one of the two first areas 141 and the respective one of the two first areas 141 deforms, the epidermal layer 140 can generate a deformation without forming bumps.

In an embodiment, the skeleton 120 is arranged with two bulges 123. Each of the two bulges 123 is in an arc shape following a swing amplitude of the first rocker 1323 or the second rocker 1331. Each of the two bulges 123 is received in the respective one of the two first slide slots 121. The epidermal layer 140 is attached to the two bulges 123. In specific applications, when a size of the intelligent flexible biomimetic facial-expression robot 100 increases, due to engineering system errors, a bulge may be formed by at least one of the two first contact portions 13233 of the first rocker 1323 in a part of a corresponding one of the two first areas 141, resulting in an uncontrollable situation in the expression change of the robot. This uncontrollable situation is caused by a radial deviation of the first rocker 1323 or the second rocker 1331 during swinging. Therefore, it is necessary that the skeleton 120 is arranged with the two bulges 123 to solve the problem of the radial deviation of the first rocker 1323 or the second rocker 1331. In this embodiment, each of the two bulges 123 is in an arc shape following the swing amplitude of the first rocker 1323 or the second rocker 1331, each of the two bulges 123 is received in the respective one of the two first slide slots 121, and the epidermal layer 140 is attached to the two bulges 123. In this way, influences caused by robot system error on the expression change of the robot can be reduced.

In an embodiment, the drive means 130 further includes an eye drive module 135, a cheek drive module 136, and a lip drive module 137. The epidermal layer 140 further defines two third areas 143, two first opening areas 144, and a second opening area 145. The skeleton 120 further defines two second slide slots 124 and a second notch 125. The eye drive module 135 includes two second drive sources 1351, two second cranks 1352, a tilting rod 1353, two frames 1354, and two eyeball models 1355. Each of the two second drive sources 1351 is connected to the mounting bracket 131 and is configured to drive a respective one of the two second cranks 1352. One of the two second cranks 1352 abuts against one end of the tilting rod 1353, the other of the two second cranks 1352 abuts against the other end of the tilting rod 1353. The two eyeball models 1355 are spaced apart from each other. Each of the two eyeball models 1355 is inserted into a respective one of the two frames 1354. One of the two eyeball models 1355 is connected to one end of the tilting rod 1353, and the other of the two eyeball models 1355 is connected to the other end of the tilting rod 1353. Each of the two eyeball models 1355 penetrates a respective one of the two first notches 122 and is received in a respective one of the two first opening areas 144. The cheek drive module 136 includes a third drive source 1361, a third crank 1362, an adapter 1363, and four third rockers 1364. The third drive source 1361 is connected to the mounting bracket 131 and is configured to drive the third crank 1362. The third crank 1362 abuts against the adapter 1363. Each of the four third rockers 1364 abuts against the adapter 1363. Two of the four third rockers 1364 are configured to slide in one of the two second slide slots 124, and the other two of the four third rockers 1364 are configured to slide in the other of the two second slide slots 124. A distal end of each of the two of the four third rockers 1364 abuts against one of the two third areas 143, and a distal end of each of the other two of the four third rockers 1364 abuts against the other of the two third areas 143. The lip drive module 137 includes a fourth drive source 1371, a fourth crank 1372, and a fourth rocker 1373. The fourth drive source 1371 is connected to the mounting bracket 131 and is configured to drive the fourth crank 1372. The fourth crank 1372 abuts against the fourth rocker 1373. The fourth rocker 1373 passes through the second notch 125. A distal end of the fourth rocker 1373 is located in the second opening area 145. In specific applications, each of the two second drive sources 1351 is connected to the mounting bracket 131 and is configured to drive the respective one of the two second cranks 1352, one of the two second cranks 1352 abuts against one end of the tilting rod 1353, the other of the two second cranks 1352 abuts against the other of the tilting rod 1353, each of the two eyeball models 1355 is inserted into the respective one of the two frames 1354, the two eyeball models 1355 are spaced from each other, one of the two eyeball models 1355 is connected to one end of the tilting rod 1353, the other of the two eyeball models 1355 is connected to the other end of the tilting rod 1353, and each of the two eyeball models 1355 penetrates the respective one of the two first notches 122 and is received in the respective one of the two first opening areas 144. In this way, when each of the two second drive sources (servo motors) 1351 rotates an angle, the tilting rod 1353 may deflect, move, etc., thereby driving a respective one of the two eyeball models 1355 to deflect or move in the respective one of the two first opening areas 144 to cooperate with the deformation of the epidermal layer 140 to generate expressions.

The third drive source (servo motor) 1361 is connected to the mounting bracket 131 and is configured to drive the third crank 1362, the third crank 1362 abuts against the adapter 1363, each of the four third rockers 1364 abuts against the adapter 1363, two of the four third rockers 1364 are configured to slide in one of the two second slide slots 124, and the other two of the four third rockers 1364 are configured to slide in the other of the two second slide slots 124, and an end of each of the two of the four third rockers 1364 abuts against one of the two third areas 143, and an end of each of the other two of the four third rockers 1364 abuts against the other of the two third areas 143, thus the facial expression of the epidermal layer 140 can be changed.

The fourth drive source (servo motor) 1371 is connected to the mounting bracket 131 and is configured to drive the fourth crank 1372, the fourth crank 1372 abuts against the fourth rocker 1373, the fourth rocker 1373 passes through the second notch 125, and the distal end of the fourth rocker 1373 is located in the second opening area 145. In this way, the second opening area 145 can be driven by the distal end of the fourth crank 1372, enabling the second opening area 145 of the epidermal layer 140 to generate expressions.

In a possible implementation manner, the tilting rod 1353 includes a rod body 13531, a first drive portion 13532, and a second drive portion 13533. The first drive portion 13532 is connected to an end of the rod body 13531, and the second drive portion 13533 is connected to the other end of the rod body 13531. One side of the first drive portion 13532 abuts against one of the two second cranks 1352, and the other side of the first drive portion 13532 is rotatably connected with one of the two eyeball models 1355. One side of the second drive portion 13533 abuts against the other of the two second cranks 1352, and the other side of the second drive portion 13533 is rotatably connected with the other of the two eyeball models 1355. In specific applications, to enable the tilting rod 1353 to drive the two eyeball models 1355 to deflect and move, the first drive portion 13532 is connected to an end of the rod body 13531, the second drive portion 13533 is connected to the other end of the rod body 13531, one side of the first drive portion 13532 abuts against one of the two second cranks 1352, the other side of the first drive portion 13532 is rotatably connected with one of the two eyeball models 1355, one side of the second drive portion 13533 abuts against the other of the two second cranks 1352, and the other side of the second drive portion 13533 is rotatably connected with the other of the two eyeball models 1355. In this way, by controlling movements of the first drive portion 13532 and the second drive portion 13533, the two eyeball models 1355 can move flexibly, such as eye deflect, eye laterally move, etc.

In an embodiment, a length direction of the tilting rod 1353 is defined as a first direction, and a height direction of the tilting rod 1353 is defined as a second direction. A side of the first drive portion 13532 opens a first slot 13501 along the first direction. On the same side as the side of the first drive portion 13532, a side of the second drive portion 13533 opens a second slot 13502 along the second direction. One of the two second cranks 1352 is received in the first slot 13501 and abuts against the first drive portion 13532. The other of the two second cranks 1352 is received in the second slot 13502 and abuts against the second drive portion 13533. In specific applications, to facilitate the control of the tilting rod 1353 to deflect or move laterally, a side of the first drive portion 13532 opens a first slot 13501 along the first direction. On the same side as the side of the first drive portion 13532, a side of the second drive portion 13533 opens a second slot 13502 along the second direction. One of the two second cranks 1352 is received in the first slot 13501 and abuts against the first drive portion 13532. The other of the two second cranks 1352 is received in the second slot 13502 and abuts against the second drive portion 13533. In this way, when the two second drive sources 1351 respectively rotate with an angle, one of the two second cranks 1352 is received in the first slot 13501 to abut against the first drive portion 13532, and the other of the two second cranks 1352 is received in the second slot 13502 to abut against the second drive portion 13533, thereby enabling the tilting rod 1353 to deflect or move laterally.

In an embodiment, each of the four third rockers 1364 includes a third connection portion 13641, a third body 13642, a third contact portion 13643, and a tray 13644. One end of the third body 13642 of a respective one of the four third rockers 1364 is connected with the third connection portion 13641 of the respective one of the four third rockers 1364. The other end of the third body 13642 of the respective one of the four third rockers 1364 is connected with the third contact portion 13643 of the respective one of the four third rockers 1364. The third crank 1362 is configured to drive the third connection portion 13641 of the respective one of the four third rockers 1364 through abutting against the adapter 1363. The tray 13644 of the respective one of the four third rockers 1364 is located between the third body 13642 of the respective one of the four third rockers 1364 and the third contact portion 13643 of the respective one of the four third rockers 1364, so that the third contact portion 13643 of the respective one of the four third rockers 1364 abuts against a corresponding one of the two third areas 143 and the tray 13644 of the respective one of the four third rockers 1364 is attached to a periphery of the corresponding one of the two third areas 143. In specific applications, the tray 13644 of the respective one of the four third rockers 1364 is located near the third contact portion 13643 of a corresponding one of the four third rockers 1364, so when the third contact portion 13643 of the respective one of the four third rockers 1364 abuts against a corresponding one of the two third areas 143, the tray 13644 of the respective one of the four third rockers 1364 is attached to a periphery of the corresponding one of the two third areas 143. In this way, when the third contact portion 13643 of the respective one of the four third rockers 1364 drives the corresponding one of the two third areas 143 of the epidermal layer 140 to deform, the tray 13644 of the corresponding one of the four third rockers 1364 coordinates the deformation of the periphery of the corresponding one of the two third areas 143 of the epidermal layer 140, so that the deformation of the four third areas 1364 of the epidermal layer 140 can be more natural and biomimetic. Particularly, the tray 13644 of the respective one of the four third rockers 1364 may be circular, semicircular, or elliptical. The third body 13642 of the respective one of the four third rockers 1364 may be cylindrical, crutch-shaped, or branch-shaped. In this way, when the third body 13642 of the respective one of the four third rockers 1364 is crutch-shaped or branch-shaped, a position of the third contact portion 13643 of the respective one of the four third rockers 1364 relative to the corresponding one of the two third areas 143 can be adjusted without changing an internal structure of the cheek drive module 136, thereby changing deformation characteristics of the two third areas 1364 of the epidermal layer 140 under an action of the third contact portion 13643 of the respective one of the four third rockers 1364.

In an embodiment, an angle of a movement of the each of the four third areas 1364 of the epidermal layer 140 driven by the third contact portion 13643 of the respective one of the four third rockers 1364 is in a range of 0° to 60°. In specific applications, a continuous change process of the angle of the movement of each of the four third areas 1364 of the epidermal layer 140 driven by the third contact portion 13643 of the respective one of the four third rockers 1364 from 0° to 60° corresponds to an adjustment process of micro-expressions, natural expressions, and exaggerated expressions. In addition, a shape, size, number, and position parameters of the third contact portion 13643 of the respective one of the four third rockers 1364 can be selectively adjusted according to requirements of different degrees of expressions. Particularly, the third contact portion 13643 of the respective one of the four third rockers 1364 can drive each of the two third areas 1364 of the epidermal layer 140 to tilt upwards to produce a happy-like expression such as smiling, and the third contact portion 13643 of the respective one of the four third rockers 1364 can also drive each of the two third areas 1364 of the epidermal layer 140 to move downwards to produce a sad-like expression such as crying, thereby increasing interesting expressions of the intelligent flexible biomimetic facial-expression robot 100.

In an embodiment, the fourth rocker 1373 includes a support portion 13731. The support portion 13731 is located at an end of the fourth rocker 1373 away from the fourth crank 1372. The support portion 13731 abuts against an area of the epidermal layer 140 below the second opening area 145. In specific applications, a length of the support portion 13731 is substantially in consistence with that of the second opening area 145. In this way, the support portion 13731 can more naturally drive the epidermal layer 140 below the second opening area 145 to deform, enabling the biomimetic process of opening and closing the mouth of the expression robot to be closer to the human expression change process. However, a change of the mouth shape is related to a deformation amplitude of the epidermal layer 140 below the second opening area 145. For example, for micro-expressions, a deformation amplitude of the mouth shape is smaller compared with that of natural expressions, while for exaggerated expressions, the deformation amplitude of the mouth shape is larger compared with that of natural expressions. Therefore, the length of the support portion 13731 is −5 mm to 10 mm of the length of the second opening area 145.

The embodiments described above only express several implementation modes of the present disclosure, and their descriptions are relatively specific and detailed, but they should not be therefore understood as limitations to the scope of the patent of the present disclosure. It should be noted that, for those skilled in the art, without departing from the concept of the present disclosure, modifications and improvements can still be made, which all belong to the protection scope of the present disclosure. Therefore, the protection scope of the present disclosure should be subject to the appended claims.

What is claimed is:

1. An intelligent flexible biomimetic facial-expression robot, comprising:
   a model head;
   a skeleton, defining two first slide slots and two first notches, wherein a side of the skeleton is attached to a side of the model head, and each of the two first slide slots is communicated with a respective one of the two first notches;
   a drive means, located in the model head and comprising a mounting bracket;
      an eyebrow drive module, connected to the mounting bracket and comprising a first drive source, a first crank, and a first rocker, wherein the first drive source is connected to the mounting bracket and configured to drive the first crank, the first crank is configured to drive the first rocker; the first rocker comprises a first connection portion, a first body, and two first contact portions, an end of the first body is connected with the first connection portion, and the other end of the first body is connected with the two first contact portions; the first crank abuts against the first connection portion and is configured to drive the first connection portion, and
      an eyelid drive module, connected to the mounting bracket and comprising a second rocker, wherein the first crank is configured to asynchronously drive the first rocker and the second rocker; the second rocker comprises a second connection portion, a second body, and two second contact portions; an end of the second body is connected with the second connection portion, and the other end of the second body is connected with the two second contact portions; the first crank abuts against the second connection portion and is configured to drive the second connection portion, and the first crank is located between the first connection portion and the second connection portion; and
   an epidermal layer, attached to the other side of the skeleton away from the model head and defining two first areas and two second areas towards the skeleton; wherein each of the first body and the second body passes through the two first slide slots, each of the two first contact portions is embedded in a respective one of the two first areas or wrapped by the respective one of the two first areas, and each of the two second contact portions is embedded in a respective one of the two second areas or wrapped by the respective one of the two second areas; when the first drive source drives the first crank, the two first contact portions drive the two first areas of the epidermal layer, asynchronous with respect to the two second contact portions driving the two second areas of the epidermal layer, and the two first areas and the two second areas of the epidermal layer flexibly deform to generate expressions.

2. The intelligent flexible biomimetic facial-expression robot as claimed in claim 1, wherein each of the two first areas defines a first groove, and each of the two first contact portions is embedded in the first groove of the respective one of the two first areas, and the first groove of the respective one of the two first areas and the each of the two first contact portions satisfy a relationship:

$$1/4 \leq h/d \leq 2/3;$$

wherein d represents a width of the first groove of the respective one of the two first areas, and h represents a thickness of the each of the two first contact portions.

3. The intelligent flexible biomimetic facial-expression robot as claimed in claim 1, wherein each of the two first areas is arranged with a first protrusion, and each of the two first contact portions is wrapped by the first protrusion of the respective one of the two first areas.

4. The intelligent flexible biomimetic facial-expression robot as claimed in claim 1, wherein each of the two first contact portions is arranged with a rounded corner at a contact position with the respective one of the two first areas.

5. The intelligent flexible biomimetic facial-expression robot as claimed in claim 1, wherein the drive means further comprises a first support member, the first support member is connected to the mounting bracket, and the two second areas are spaced apart from and symmetrical to each other; the first support member extends downward from a middle portion of the two second areas and abuts against the epidermal layer, and at least two support ends are formed by the first support member supporting the epidermal layer.

6. The intelligent flexible biomimetic facial-expression robot as claimed in claim 2, wherein the epidermal layer is made of silicone or triblock copolymer, the first groove of the respective one of the two first areas and the epidermal layer satisfy a relationship:

$$1/3 \leq t/p \leq 2/3;$$

wherein t represents a depth of the first groove of the respective one of the two first areas, and p represents a thickness of the epidermal layer.

7. The intelligent flexible biomimetic facial-expression robot as claimed in claim 1, wherein the skeleton is arranged with two bulges, each of the two bulges is in an arc shape following a swing amplitude of the first rocker or the second rocker, each of the two bulges is received in a respective one of the two first slide slots, and the epidermal layer is attached to the two bulges.

8. The intelligent flexible biomimetic facial-expression robot as claimed in claim 1, wherein the drive means further comprises an eye drive module, a cheek drive module, and a lip drive module, the epidermal layer further defines two third areas, two first opening areas, and a second opening area, and the skeleton further defines two second slide slots and a second notch; the eye drive module comprises two second drive sources, two second cranks, a tilting rod, two frames, and two eyeball models; each of the two second drive sources is connected to the mounting bracket and is configured to drive a respective one of the two second cranks; one of the two second cranks abuts against one end of the tilting rod, the other of the two second cranks abuts against the other of the tilting rod; the two eyeball models are spaced apart from each other, each of the two eyeball models is inserted into a respective one of the two frames, one of the two eyeball models is connected to one end of the tilting rod, and the other of the two eyeball models is connected to the other end of the tilting rod; each of the two eyeball models penetrates a respective one of the two first notches and is received in a respective one of the two first opening areas;
   the cheek drive module comprises a third drive source, a third crank, an adapter, and four third rockers; the third drive source is connected to the mounting bracket and is configured to drive the third crank, the third crank abuts against the adapter, and each of the four third rockers abuts against the adapter; two of the four third rockers are configured to slide in one of the two second slide slots, and the other two of the four third rockers are configured to slide in the other of the two second slide slots; a distal end of each of the two of the four third rockers abuts against one of the two third areas, and a distal end of each of the other two of the four third rockers abuts against the other of the two third areas;

the lip drive module comprises a fourth drive source, a fourth crank, and a fourth rocker, the fourth drive source is connected to the mounting bracket and is configured to drive the fourth crank, the fourth crank abuts against the fourth rocker, the fourth rocker passes through the second notch, and a distal end of the fourth rocker is located in the second opening area.

9. The intelligent flexible biomimetic facial-expression robot as claimed in claim 8, wherein the tilting rod comprises a rod body, a first drive portion, and a second drive portion, the first drive portion is connected to an end of the rod body, and the second drive portion is connected to the other end of the rod body; one side of the first drive portion abuts against one of the two second cranks, and the other side of the first drive portion is rotatably connected with one of the two eyeball models; one side of the second drive portion abuts against the other of the two second cranks, and the other side of the second drive portion is rotatably connected with the other of the two eyeball models.

10. The intelligent flexible biomimetic facial-expression robot as claimed in claim 9, wherein a length direction of the tilting rod is defined as a first direction, and a height direction of the tilting rod is defined as a second direction; a side of the first drive portion opens a first slot along the first direction, and on the same side as the side of the first drive portion, a side of the second drive portion opens a second slot along the second direction; one of the two second cranks is received in the first slot and abuts against the first drive portion, and the other of the two second cranks is received in the second slot and abuts against the second drive portion.

11. The intelligent flexible biomimetic facial-expression robot as claimed in claim 8, wherein each of the four third rockers comprises a third connection portion, a third body, a third contact portion, and a tray; one end of the third body of a respective one of the four third rockers is connected with the third connection portion of the respective one of the four third rockers, and the other end of the third body of the respective one of the four third rockers is connected with the third contact portion of the respective one of the four third rockers; the third crank is configured to drive the third connection portion of the respective one of the four third rockers through abutting against the adapter; the tray of the respective one of the four third rockers is located between the third body of the respective one of the four third rockers and the third contact portion of the respective one of the four third rockers, and the third contact portion of the respective one of the four third rockers abuts against a corresponding one of the two third areas and the tray of the respective one of the four third rockers is attached to a periphery of the corresponding one of the two third areas.

12. The intelligent flexible biomimetic facial-expression robot as claimed in claim 11, wherein an angle of a movement of the each of the four third areas of the epidermal layer driven by the third contact portion of the respective one of the four third rockers is in a range of 0° to 60°.

13. The intelligent flexible biomimetic facial-expression robot as claimed in claim 8, wherein the fourth rocker comprises a support portion, the support portion is located at an end of the fourth rocker away from the fourth crank, and the support portion abuts against an area of the epidermal layer below the second opening area.

\* \* \* \* \*